United States Patent Office 2,995,418
Patented Aug. 8, 1961

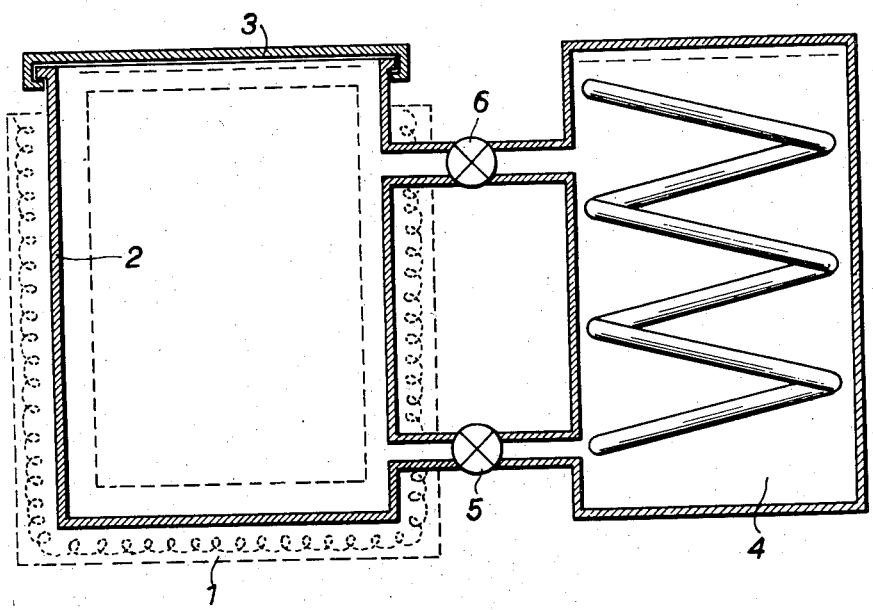

2,995,418
STERILIZING PROCESS
Arthur Müller, 17b Varnbuelstrasse, and Karl Bucher, 19 Sonnenhaldenstrasse, both of Sankt Gallen, Switzerland
Filed Mar. 7, 1958, Ser. No. 719,953
2 Claims. (Cl. 21—2)

Heretofore pharmaceutical solutions, fruit juices and other liquids have been packaged in hermetically sealed containers made of thin-walled plastic materials. This type of packaging has not been widely used for liquids which must be sterilised because the thin-walled plastic sheets presently available lose much of their strength on heating and frequently rupture upon handling. In order to overcome the difficulty of sterilizing liquids hermetically sealed in containers of thin-walled plastic materials, the filled plastic containers have been sealed in glass tubes which were then immersed in boiling water for about 30 minutes. Although this method of sterilization is effective it has not been widely practiced because it is cumbersome and expensive.

Irradiated polyethylene, polyethylene coated with another plastic substance and high-density polyethylene are able to withstand a sterilization temperature of 100° C. for a short time only and cannot be used for making thin-walled plastic containers for liquids which must be heat sterilized at 100° C. for at least 30 minutes since they deform and frequently rupture when subjected to these conditions.

Containers formed from thin-walled polyethylene, sheets and filled with a liquid cannot be heated above 80° C. for more than a few minutes without distortion and rupturing of a high percentage of the containers. Furthermore, effective sterilization of a liquid cannot be obtained at a temperature as low as 80° C.

We have now discovered a method of sterilizing the liquid in a thin-walled hermetically sealed plastic container which overcomes the difficulties of the methods described above. In its broader aspect, our method comprises immersing hermetically sealed thin-walled plastic containers filled with a liquid, in a heat exchange medium such as a liquid bath which is open to the atmosphere, a liquid bath which is sealed and not open to the atmosphere or a sealed chamber containing a gas such as air, steam or a mixture of air and steam. When the containers are immersed in a gas they are subjected to an external pressure which is slightly greater than the pressure inside the containers. The temperature of the liquid or gas in which the containers are immersed is gradually raised to just above the sterilizing temperature of 100° C. The thin-walled plastic containers would normally be deformed or ruptured at this temperature because it is substantially above the softening temperature of the plastic material; however, the pressure of any gas present in the container on the interior container wall is neutralized by the slightly greater pressure on the exterior wall of the container and thus distortion and rupture of the container wall is prevented. Thin-walled plastic containers should be filled with a liquid and sealed in such a manner that substantially no air or other gas is present in the container. This may be done by partially filling a thin-walled plastic tube with a liquid and then progressively sealing from one end of the tube across the width of the tube with the tube positioned in a manner such that the area of the tube where the seal is made is at the time of sealing below the level of the body of liquid in the tube.

All liquids should be degassed before they are introduced into the tube. The volume of gas in the filled container must be such that the volume of the liquid plus the volume of the gas is less than the volume of the container at the temperature and pressure at which sterilization is effected. This is necessary because most thermoplastic materials, such as high-pressure polyethylene, soften below the sterilization temperature, which should be at least 100° C., and softened containers are very easily deformed and ruptured if the pressure on the internal surface of the bag is only slightly greater than the pressure on the exterior surface. When the filled containers are immersed in a liquid bath during sterilization, immersion must be complete during sterilization, and after the heating period of the sterilization until the temperature of the liquid bath is below the softening point of the plastic substance of the containers. The boiling point of the liquid of the bath is preferably near the boiling point of the liquid within the container but the boiling point of the liquid in the containers must not be below the boiling point of the bath because gas pressure would then be formed in the containers, particularly if the sterilization temperature is above the boiling point of the liquid in the containers, and the containers would burst. The containers should not come in contact with any part of the vessel containing the liquid or gas in which they are immersed which is at a temperature above the bath temperature. Water is a satisfactory and the preferred liquid for use in the bath.

It is necessary to avoid the formation of gas bubbles in the liquid of the bath during sterilization so that any stress on the internal walls of the container is avoided. The bath liquid should not therefore, be heated to its boiling point but only to a point just below the boiling point. If the sterilizing temperature is higher than the boiling point of the bath liquid at normal atmospheric pressure, the sterilizing vessel must be designed as a pressure vessel, and the pressure in the vessel must be at least high enough so that the bath liquid does not boil at the sterilizing temperature. The bath liquid should have a specific gravity substantially equal and preferably less than that of the liquid in the containers so that the containers are completely immersed at all times in the liquid of the bath.

It is preferred that the sterilized containers will not be removed from the liquid bath before the liquid bath has cooled to a temperature below 50° C. because the plastic containers at this temperature are able to withstand all mechanical stress to which they may be subjected during removal.

In order to accelerate the cooling process, a part of the sterilizing liquid can be displaced by the introduction of a cooling liquid. This can be accomplished by introducing cooled bath liquid from a second vessel connected to the sterilizing apparatus into the lower part of the sterilizing vessel after sterilization is complete. A corresponding amount of hot sterilizing liquid is drawn off from the upper part of the sterilizing apparatus by means of a tube which connects with the upper part of the cooling tank. This exchange permits rapid cooling.

It is possible according to the above described process to heat thin-walled plastic containers filled with liquid and particularly polyethylene containers having a wall thickness of 0.15 mm., for 30 to 40 minutes at 100° C. Containers of high-molecular weight polyethylene may be heated to 105–110° C. or even to a higher temperature by the same process without damage to the containers.

It is to be understood that our invention is not limited to the heating and sterilization of liquids in polyethylene containers but that the sterilizing process of our invention may be generally used for containers made of thin-walled thermoplastic materials and higher sterilization temperatures may be reached than would otherwise be possible for such containers.

The accompanying drawing illustrates a device suitable for use in carrying out the process of our invention in which the heat exchange medium is a liquid such as water. A vessel 2, provided with a heating jacket 1, contains the heat exchange medium. The containers of thin-walled plastic filled with liquid which are to be sterilized are immersed in the liquid of the bath and the vessel may be closed with an airtight, pressure-resistant cover 3. A cooling unit 4 is connected to the vessel by means of tubes which have valves 5 and 6. One of the valves may be a pump. A cooling coil 7 may be positioned in cooling unit 4 through which cold water is circulated.

When gas is used as the heat exchange medium it is of course necessary to employ a closed vessel having means for introducing and withdrawing gases. The gas may be any inert gas, such as air or steam but a mixture of air and steam is preferred. The gas pressure on the exterior surfaces of the containers must be equal to and is preferably slightly greater than the pressure in the interior of the containers. More specifically, it is preferred that the pressure on the outside of the containers be about 0.1 to 0.2 atmosphere greater than the pressure inside the containers. This has an additional advantage of preventing the aqueous solution in the containers from boiling when the sterilizing temperature is 100° C.

In the application of our process to the sterilization of liquids in thin-walled plastic containers by use of a gas as a heating medium a gas and preferably steam at an elevated temperature, preferably at 102–110° C., is introduced into a closed vessel containing the containers and when the temperature of the liquid in the containers reaches a temperature of about 97° C., cold air is introduced into the vessel until the temperature of the gas in the vessel is about 102° C. The temperature of the gas is regulated so that the liquid in the containers is maintained at the sterilizing temperature of 100° C. by introducing steam or cold air.

We claim:

1. A process for sterilizing liquids contained in thin-walled, hermetically sealed plastic containers having a softening point below the sterilization temperature, which containers have been filled by partially filling a thin-walled, plastic tube sealed at one end with a liquid, progressively sealing at spaced intervals from the sealed tube end across the width of the tube while the tube is positioned so that at the time of sealing the portion of the tube at which the seal is made is below the level of the body of liquid in the tube and cutting across the tube at the areas of the seals to provide a plurality of hermetically sealed containers filled with liquid and containing only an amount of gas such that at the sterilizing temperature and pressure the combined volume of liquid and gas is not greater than the volume of the container; comprising the steps of: immersing the containers in a heat transfer medium having a specific gravity less than the specific gravity of the filled containers; gradually elevating the temperature of the heat transfer medium to a temperature above the sterilizing temperature, whereby the temperature of the liquid in the containers gradually reaches the sterilization temperature; maintaining the temperature of the heat transfer medium at a temperature such that the temperature of the liquid in the containers is maintained at the sterilizing temperature until sterilizing is effected; and gradually cooling the heat transfer medium to a temperature below the softening temperature of the plastic of the containers by introducing cool heat transfer medium and simultaneously withdrawing hot heat transfer medium, whereby the volume of the heat transfer medium remains substantially constant.

2. A process according to claim 1, in which the heat transfer medium is water and the solution in the containers is an aqueous solution having a specific gravity greater than water and a boiling point at least as high as the boiling point of water.

References Cited in the file of this patent

UNITED STATES PATENTS

| 2,380,134 | Waters | July 10, 1945 |
| 2,398,082 | Cavallito | Apr. 9, 1946 |
| 2,539,505 | Barnum | Jan. 30, 1951 |

OTHER REFERENCES

Ellis: The Chem. of Synthetic Resins, vol. 1 (1935), Reinhold Pub. Corp., N.Y.C., p. 14.